United States Patent
Leukkunen

(10) Patent No.: US 8,644,778 B2
(45) Date of Patent: Feb. 4, 2014

(54) USAGE OF MEASUREMENT ANTENNA TRANSMITTING COMMUNICATION SIGNAL FOR POWER ADJUSTMENT IN WIRELESS DEVICE

(75) Inventor: Marko J. Leukkunen, Oulu (FI)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 12/930,999

(22) Filed: Jan. 21, 2011

(65) Prior Publication Data

US 2012/0190398 A1  Jul. 26, 2012

(51) Int. Cl.
*H04W 52/30* (2009.01)
*H04W 88/02* (2009.01)

(52) U.S. Cl.
USPC .......................... 455/117; 455/575.7; 455/129

(58) Field of Classification Search
None
See application file for complete search history.

(56) References Cited

U.S. PATENT DOCUMENTS

| | | | |
|---|---|---|---|
| 6,018,646 A | 1/2000 | Myllymaki et al. | 455/115 |
| 6,408,187 B1 | 6/2002 | Merriam | 455/458 |
| 7,039,435 B2 * | 5/2006 | McDowell et al. | 455/522 |
| 7,499,722 B2 | 3/2009 | McDowell et al. | 455/522 |
| 8,326,385 B2 * | 12/2012 | Brogle et al. | 455/575.7 |
| 2003/0064761 A1 | 4/2003 | Nevermann | 455/572 |
| 2004/0214621 A1 * | 10/2004 | Ponce De Leon et al. | 455/575.8 |
| 2005/0124305 A1 * | 6/2005 | Stichelbout | 455/117 |
| 2009/0051165 A1 | 2/2009 | Frost et al. | 285/334.5 |
| 2009/0295648 A1 * | 12/2009 | Dorsey et al. | 343/702 |
| 2009/0305742 A1 | 12/2009 | Caballero et al. | 455/566 |
| 2011/0298674 A1 * | 12/2011 | Hsu et al. | 343/703 |
| 2012/0071203 A1 * | 3/2012 | Wong | 455/550.1 |

* cited by examiner

*Primary Examiner* — Philip Sobutka
(74) *Attorney, Agent, or Firm* — Harrington & Smith

(57) ABSTRACT

A method is disclosed including, using a measurement antenna in a wireless device, determining whether a user is proximate the wireless device at least by transmitting a signal using the measurement antenna; in response to a determination the user is not proximate the wireless device, transmitting the signal using a main antenna at a normal transmit power; and in response to a determination the user is proximate the wireless device, transmitting the signal using the main antenna at a limited transmit power. Another method includes in response to a determination a user is not proximate a wireless device, transmitting a signal using a first set of main antennas; and in response to a determination the user is proximate the wireless device, transmitting the signal using the second set of main antennas. Apparatus and program products are also disclosed.

22 Claims, 10 Drawing Sheets

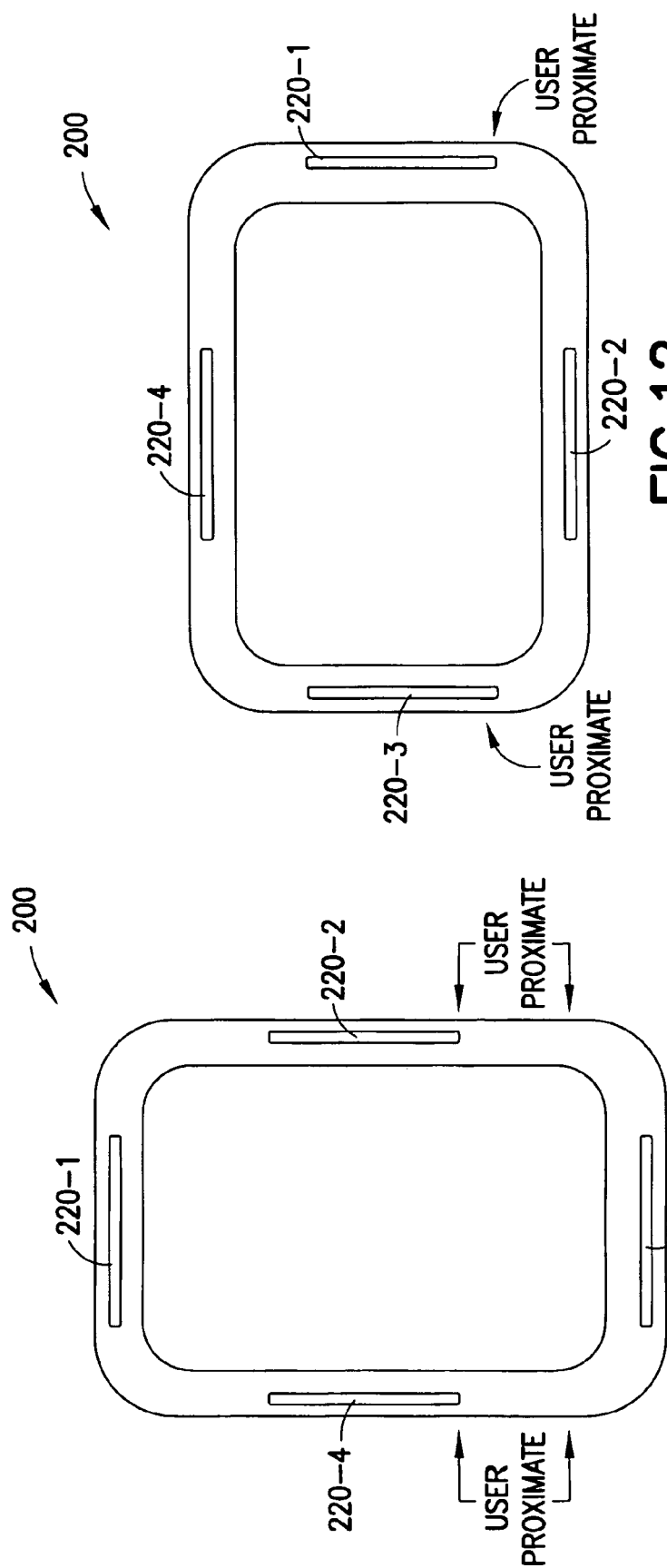

USAGE OF MEASUREMENT ANTENNA TRANSMITTING COMMUNICATION SIGNAL FOR POWER ADJUSTMENT IN WIRELESS DEVICE

TECHNICAL FIELD

This invention relates generally to mobile devices and, more specifically, relates to adjusting transmit power used for transmission in mobile devices.

BACKGROUND

Before a mobile telephone can be marketed, it typically must comply with maximum heating capacity guidelines imposed by governmental regulating organizations, such as the United States Federal Communication Commission (FCC) and many European regulatory organizations. For instance, in the United States and Europe, the telephone must meet various technical standards, including compliance with radio frequency exposure limits defined in terms of the specific absorption rate (SAR) of the mobile telephone. SAR is a widely accepted measurement of radio frequency energy absorbed into the body in watts per kilogram (W/kg) averaged over a certain amount of tissue when the telephone is situated close to or touching the human body.

In general, the SAR value of a mobile telephone depends on the average radiated power of the telephone, frequency (because of different antenna properties and material properties of the human tissue at different frequencies) and geometrical and mechanical configurations of the telephone. SAR values are most affected by the distance between any radiating structure to the human tissue and the average radiated power. The average radiated power depends on the communication standard utilized, and may vary within the standard depending on the traffic mode in use.

BRIEF SUMMARY

In an exemplary embodiment, a method is disclosed that includes using a measurement antenna in a wireless device, determining whether a user is proximate the wireless device at least by transmitting a signal using the measurement antenna. The method includes, in response to a determination the user is not proximate the wireless device, transmitting the signal using a main antenna at a normal transmit power. The method further includes, in response to a determination the user is proximate the wireless device, transmitting the signal using the main antenna at a limited transmit power that is less than a maximum value the normal transmit power can attain.

In another exemplary embodiment, an apparatus includes one or more measurement antennas and one or more main antennas. The apparatus also includes one or more processors and one or more memories including computer program code. The one or more memories and the computer program code are configured to, with the one or more processors, cause the apparatus to perform at least the following: using a selected one of the one or more measurement antennas, determining whether a user is proximate the apparatus at least by transmitting a signal using the selected measurement antenna; in response to a determination the user is not proximate the apparatus, transmitting the signal using at least one of the one or more main antennas at a normal transmit power; and in response to a determination the user is proximate the apparatus, transmitting the signal using the at least one main antenna at a limited transmit power that is less than a maximum value the normal transmit power can attain.

In yet another exemplary embodiment, a method is disclosed that includes, using a first set of antennas in a wireless device, determining whether a user is proximate the wireless device at least by transmitting a signal using at least one of the first set of antennas. The method also includes in response to a determination the user is not proximate the wireless device, transmitting the signal using the first set of antennas. The method further includes, in response to a determination the user is proximate the wireless device, switching the signal to a second set of antennas in the wireless device and transmitting the signal using the second set of antennas.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIGS. 11 and 12 are illustrations of front views of a mobile device having main antennas placed and operated according to the second aspect of the invention.

DETAILED DESCRIPTION OF THE DRAWINGS

Figure 2:
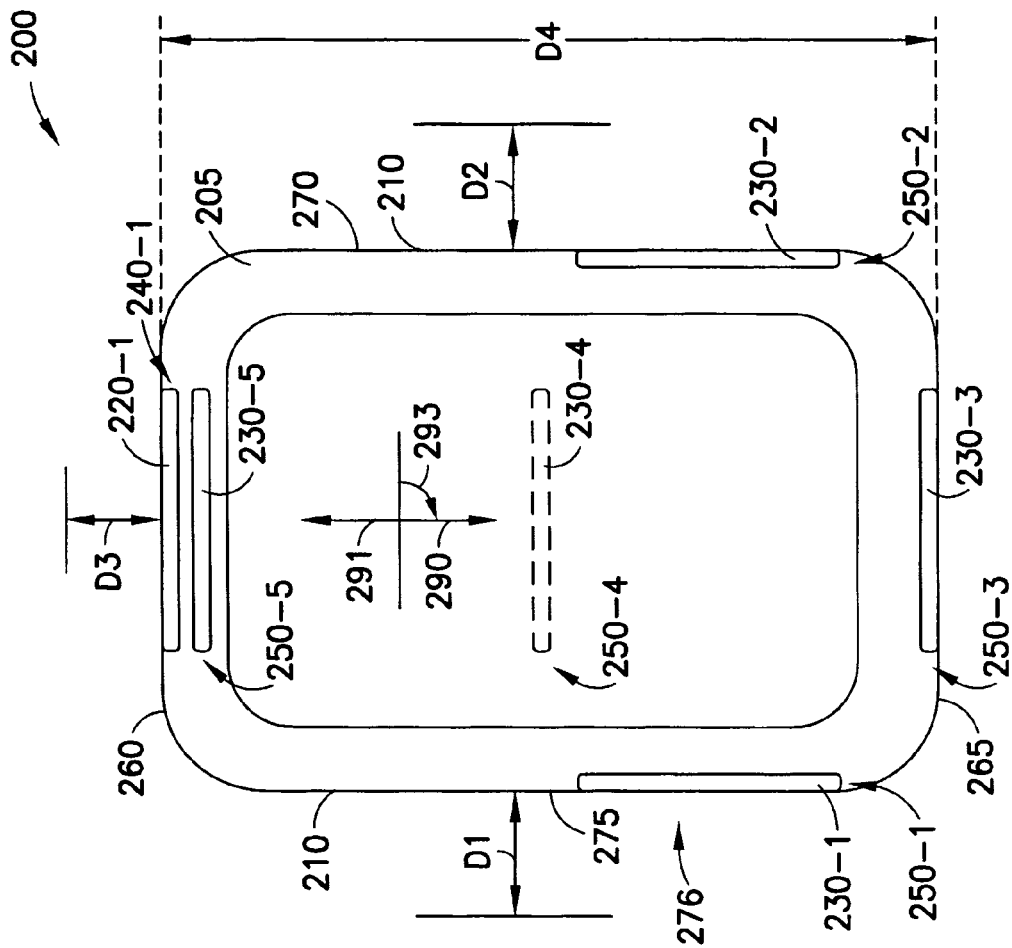
FIG. 2 is an example of a front view of a wireless device.

As described above, there are new requirements on specific absorption rate (SAR) values, and these requirements dictate power transmission reductions when a handheld wireless device is proximate to a user. For such power transmission reductions, typically the usage of a sensor is required to detect the existence of a human close to the device. Based on sensor output, the power used for transmission is reduced. However, the sensors may be erroneous (e.g., produce erroneous output), and not located in the same position as the transmit antenna. Additionally, complexity of the algorithms using these sensors and additional cost may make implementation difficult.

Furthermore, new requirements on SAR values are more stringent, and require power transmission reduction when a wireless device is proximate to a user. New wireless devices have to comply with these requirements. These requirements therefore affect wireless devices such as mobile telephones, tablets, and universal serial bus (USB) modems. For tablets and USB modems in particular, a user is likely to be using these with the devices on the lap or near other portions of the body. Consequently, meeting SAR requirements for tablets, for instance, involves meeting different criteria than meeting SAR requirements for, e.g., mobile telephones.

In one aspect, exemplary embodiments of the instant invention utilize information obtained from a measurement transmit antenna, or a system of such antennas, to determine the likelihood of existence of the user at the proximity (e.g., a predetermined distance from the wireless device or touching the wireless device) of wireless devices such as handheld wireless devices. There is no need for additional sensors. A measurement function uses the measurement transmit antenna for user proximity sensing, and in response to a user being sensed as being proximate the wireless device, the transmitted power is controlled to a SAR limit complying level.

Exemplary embodiments of the invention use at least one separate measurement transmit antenna to measure a reflected power to transmitted power ratio (e.g., standing wave ratio, SWR). The measurement transmit antenna(s) is matched so that this antenna is highly sensitive to a human proximate (e.g., a human body presence or human body parts presence) the wireless device. The main transmit antenna (used in normal transmission) is designed as a normal antenna would be designed, e.g., insensitive to human body and with whatever other parameters are normally required. However, the measurement transmit antenna is designed to be sensitive to proximity of a human.

When proximity measurement is needed, a system switches the transmit signal to a measurement antenna and measurement is acquired for user presence. The transmitted signal is not disturbed in any way, but if the user is present the reflected power is easier to measure since the antenna matching is affected by the user and reflected power is easier to detect (relative to a transmit antenna not made sensitive to human proximity). It is noted that the transmitted signal might be disturbed if transmission frequency is changed in order to provide for measurements to be taken. When user presence is detected, in an exemplary embodiment, the measurement is repeated in certain intervals, in order to measure a change in user presence or until other factors change such that proximity measurement is no longer needed. Such other factors include, e.g., the mobile device transitioning to offline, the transmission has ended, or the transmission level requested by the cellular network for the device is reduced to a safe level (see FIG. 7). The transmit power is regulated according to the likelihood a user is proximate the wireless device. It is noted that in certain networks (such as cellular networks), the network controls the transmission power of all mobile devices under the control of the network, through, e.g., signal strengths the network determines from received signals and network management. Here, the mobile device would ignore the requested transmit power and limit the transmit power when needed.

In another aspect, in a wireless device having multiple antennas, the transmission power is not altered in any way in one embodiment. Instead, the wireless device directs the signal to the antenna (or antennas) that is (are) not reflecting the signal back from the antenna(s), thus the user is not affecting this antenna (these antennas). In this exemplary implementation, one would need to have the knowledge that this is still a safe way to transmit (in terms of SAR limits) with full power with the user proximate (e.g., holding) the wireless device. Additionally, the selected antennas may also transmit at a limited transmit power that is less than a maximum value the normal transmit power may attain.

Figure 1:
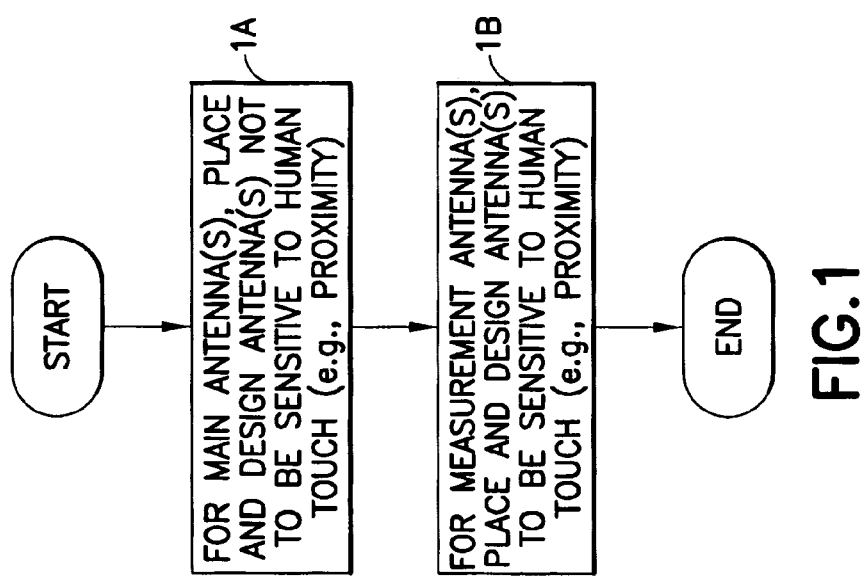
FIG. 1 is a block diagram of an exemplary flowchart for creating a handheld wireless device with main and measurement transmit antennas.

Turning to FIG. 1, a block diagram is shown of an exemplary flowchart for creating a wireless device with main and measurement transmit antennas. This example illustrates certain operations taken during design of a wireless device in accordance with exemplary embodiments herein. In block 1A, for the main transmit antenna(s), a designer places and designs these antenna(s) not to be sensitive to human touch (e.g., proximity) in the wireless device. As is known, there are steps that are followed to make an antenna not so sensitive (e.g., insensitive) to human touch. That is, for instance, when a hand of a user is in contact with a case of a mobile device, the antenna performance and matching is not degraded below certain criteria.

In block 1B, the designer, for measurement antenna(s), places and designs the measurement transmit antenna(s) to be sensitive to human touch (e.g., proximity). For simplicity, "main transmit antenna(s)" herein will mainly be referred to as "main antenna(s)", and "measurement transmit antenna(s)" herein will mainly be referred to as "measurement antenna(s)". It should be noted that the main transmit antennas and measurement transmit antennas are not limited to transmission and may be used for reception. If the main antennas are also used for diversity reception, placement of the main antennas should be taken into account. Relative to block 1A, the ideology that is used to satisfy that block may be reversed, in an exemplary embodiment, so that a designer can take some steps to make an antenna sensitive to human touch. Such steps include placement of the antenna, types and placement of surrounding materials, and design of the matching. A designer could also make the slopes of transition band from the pass band to stop band of the antenna more steep or one of those slopes more steep so that when the matching is, e.g., shifted higher in frequency, the matching (using in the measurement mode the lowest possible frequency for instance) would get worse very quickly with user proximity. An example of this is described in reference to FIG. 3.

An example of a wireless device 200 designed in accordance with the block diagram of FIG. 1 is shown in FIG. 2, which shows an example of a front view of a wireless device 200. The wireless device 200 in this example has a case 205 with a top 260, a bottom 265, a right side 270, a left side 275, and an outer periphery 210. In this example, there is a single main antenna 220-1, placed near the top 260 in corresponding location 240-1. In this example, the proximity is illustrated as a distance D3, where a human is considered proximate the top 260 if a human is within distance D3, including touching the case 205 at the top 260. The antennas 220 are designed to be insensitive to human proximity in accordance with block 1A of FIG. 1.

This example also shows a lower portion 290 (e.g., the lower two thirds of the mobile device 200, which has a "length" of D4) and an upper portion 291 of the mobile device 200. A designer has a number of choices. Two measurement antennas 230-1, 230-2 may be placed near the left side 275 and right side 270 of the wireless device 200, in locations 250-1, 250-2 respectively. These measurement antennas 230 are designed to be more sensitive to user proximity than is the main antenna 220-1. In this example, the proximity is illustrated as a distance D1 to the left side 275, where a human is considered proximate the left side 275 if a human is within distance D1, including touching the case 205 at the left side 275. Similarly, the proximity is illustrated as a distance D2 to the right side 270, where a human is considered proximate the right side 270 if a human is within distance D2, including touching the case 205 at the right side 270. A designer may similarly place a measurement antenna 230-3 near the bottom 265 of the mobile device 200, in location 250-3. These locations 250-1 through 250-3 might be useful, e.g., if a user is expected to place his or her hands proximate these locations.

Another option is a measurement antenna 230-4, placed in location 250-4, which is near the backside 276 of the mobile device 200. This location 250-4 might be useful in certain devices, such as tablets, where a user might place the mobile device 200 on his or her lap for instance. A further option is a placement of a measurement antenna 230-5 in location 250-5, which is near the main antenna 220-1. In an exemplary embodiment, the measurement antenna 230-5 is placed as close to the location 240-1 of the main antenna 220-1 as possible. This location 250-5 might be useful, e.g., if a user is expected to place his or her head near the main antenna 220-1 when in a cellular call.

Figure 3:
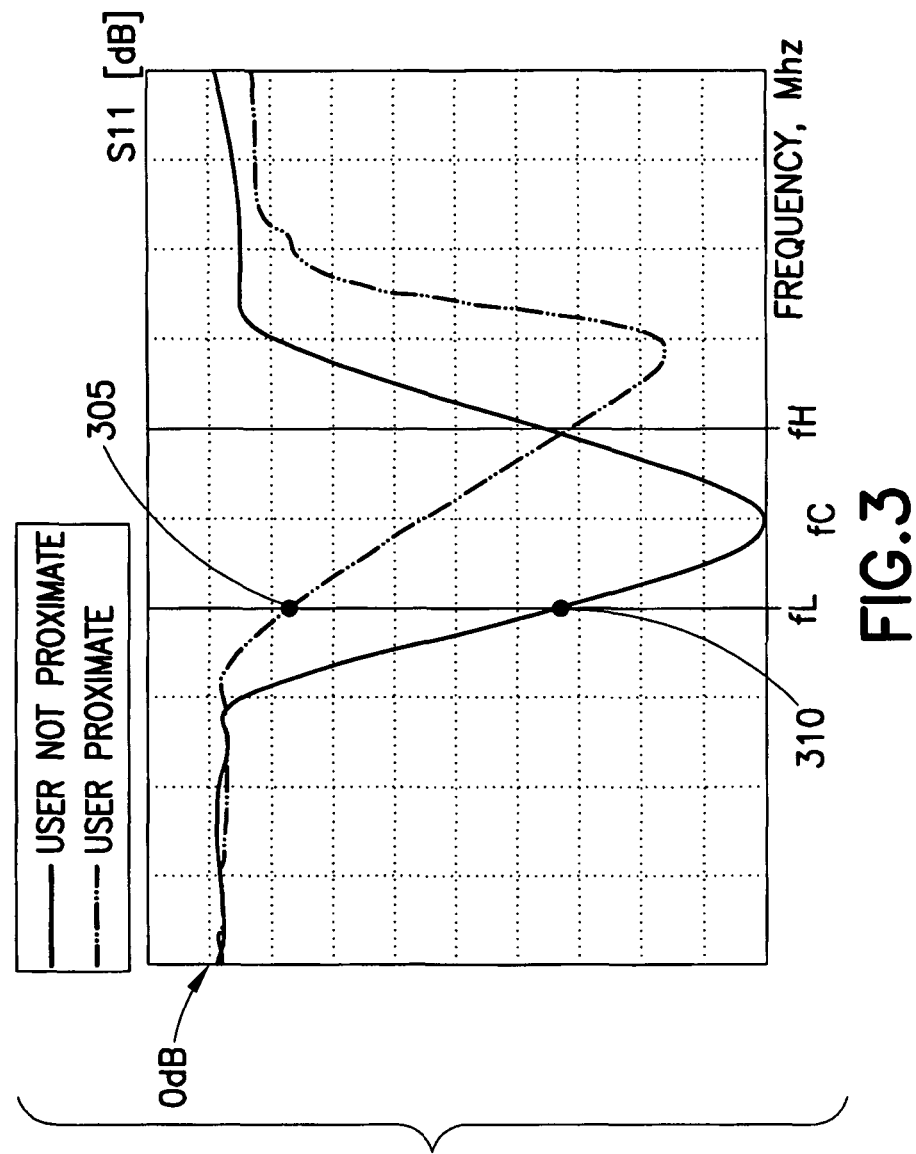
FIG. 3 is an example of an exemplary plot of S11 for a measurement transmit antenna when a user is proximate or not proximate the handheld wireless device.

An example of how one of the antennas 230 may be designed to be sensitive to proximity of a user is shown in FIG. 3. FIG. 3 is an example of an exemplary plot of S11 (in decibels, dB) for a measurement transmit antenna when a user is proximate or not proximate the handheld wireless device (e.g., wireless device 200). In FIG. 3, there is an antenna matched for a low frequency, fL, to a high frequency, fH, with fC being the center frequency. In this example, the frequency is in megahertz (MHz). The user proximate line illustrates the matching with the frequency matching shifted upwards (in frequency) as a result of user proximity. The user proximate line indicates when a user is proximate the wireless device and is a dashed line. As one can see, the matching of the lowest frequency has dramatically degraded matching when the user is proximate the antenna/wireless device.

In this example, the system would transmit in the lowest frequency range (e.g., centered about fL) of the transmitter during the measurement, as this frequency range is the most sensitive for user presence. In this example, when the user is proximate the antenna/wireless device, there is a higher amount of reflected power at point 305 than there is at point 310 (where the user is not proximate). In terms of SWR, the SWR measured at point 305 is higher than the SWR measured at point 310. Meanwhile, at fH, both curves for the user proximate and the user not proximate S11 parameter have about the same amount of reflected power. The highest transmit frequency would be used if the matching caused a shift downwards in frequency with user presence. In some cases the user presence could degrade matching in whole pass band, resulting in higher SWR in all transmission frequencies.

Returning to FIGS. 1 and 2, the examples given above are merely exemplary. For instance, if the wireless device 200 may be used both as shown and so that the device can be rotated by 90 degrees (as illustrated by reference 293), the placement and design of the main antennas 220 and measurement antennas 230 may be different.

Figure 4:
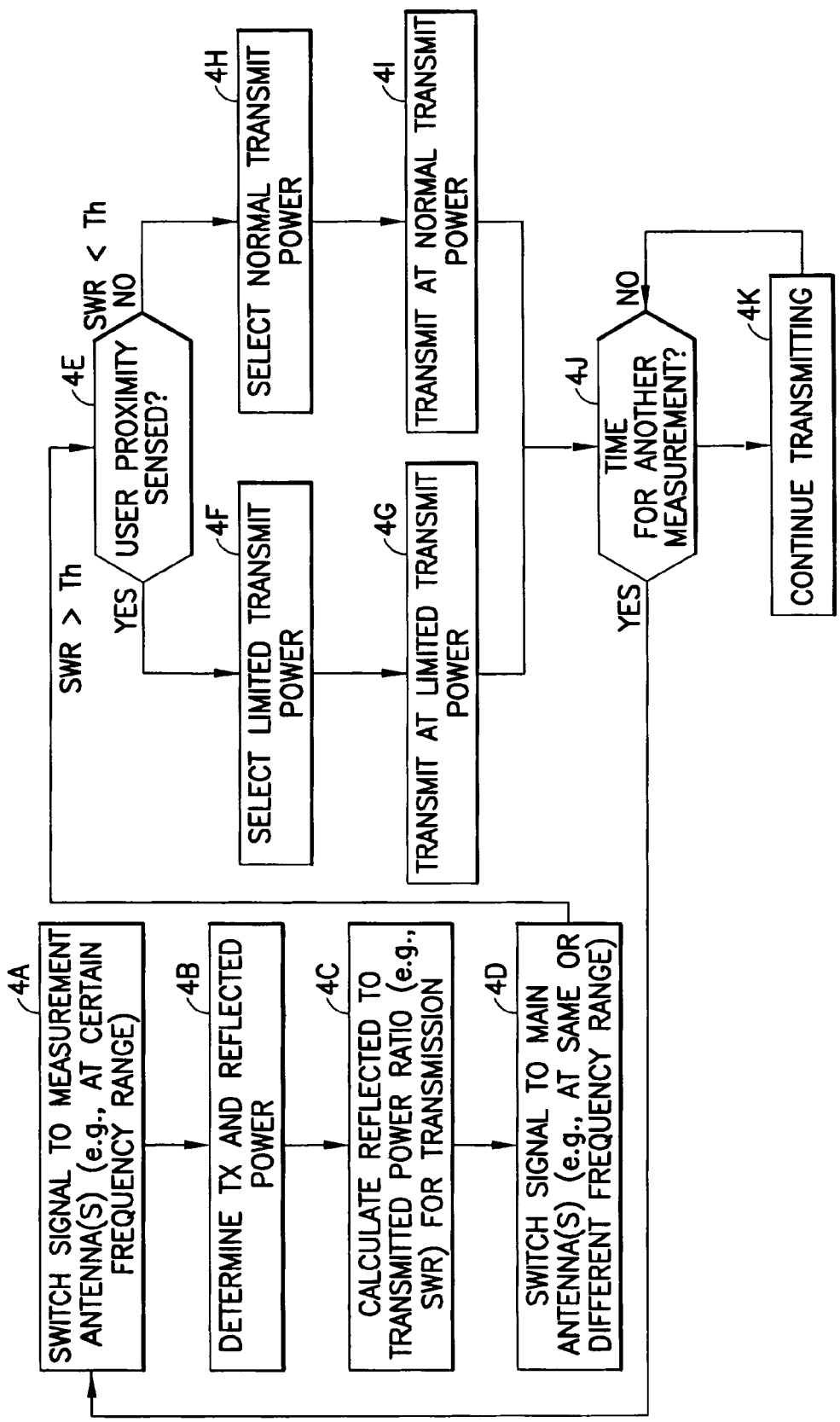
FIG. 4 is a block diagram of an exemplary flowchart for using main and measurement antennas for power adjustment.

Assuming that a wireless device 200 has been designed, e.g., according to FIG. 1, the measurement antennas may be used to determine whether a user is proximate a wireless device 200. For instance, turning to FIG. 4, a block diagram is shown of an exemplary flowchart for using main and measurement transmit antennas for power adjustment. The blocks in the block diagram may be operations performed under the control of, e.g., one or more processors executing computer program code (e.g., software, firmware), operations performed under the control of hardware (e.g., by an integrated circuit), or by some combination of operations performed using software (executed by hardware) or hardware.

In block 4A, a signal is switched to a measurement antenna 230 (e.g., from a normal antenna 220). As described above, a certain frequency range may be used during transmission using the measurement antenna 230. It is noted that typically the measurement antenna 230 transmits a normal signal, containing whatever data is being transmitted at the time. In block 4B, the transmitted (TX) and reflected power are determined.

In block 4C, the reflected to transmitted power ratio (e.g., SWR) for the transmission is determined. It is noted that the time period while the signal is switched to the measurement antenna may be a very short time period, such as a few milliseconds (ms), time to get a reading for detection and the signal to settle.

In block 4D, the signal is switched back to the main antenna 220 (or antennas), typically although not necessarily in the same frequency range used for the transmission by the measurement antenna 230. In block 4E, it is determined if the user proximity is sensed. In an exemplary embodiment, a user proximity is sensed is sensed if the SWR is greater than a threshold (Th) (block 4E=YES), and a user proximity is not sensed if the SWR is less than the threshold (block 4E=NO). However, SWR is one example and other techniques may be used.

If the user proximity is sensed (block 4E=YES), a decision is made in block 4F to select a limited transmit power, and in block 4G, the limited transmit power (i.e., less than a maximum value the normal transmit power may attain) is applied to the main antenna(s) 220. Typically, the limited transmit power is less than a SAR exceeding transmit power level. If the user proximity is not sensed (block 4E=NO), a decision is made in block 4H to select the normal transmit power (i.e., greater than the limited transmit power), and in block 4I, the normal transmit power is applied to the main antenna(s) 220. As described below in reference to FIGS. 7 and 8, the normal transmit power may vary depending on what the system (e.g., wireless device) requires and will have a maximum value.

In block 4J, it is determined if it is time for another measurement. If so (block 4J=YES), the flow continues to block 4A. If not (block 4H=NO), then the wireless device continues transmitting in block 4K at the limited transmit power (4G) or the normal transmit power (4I).

It is noted that if multiple measurement antennas are used, typically blocks 4A-4C would be performed for each measurement antenna individually. For instance, if two measurement antennas are used, a first measurement antenna would be selected and switched to in block 4A, then measurements and calculations would be made in blocks 4B and 4C. The second measurement antenna would then be selected and switched to in block 4A, then measurements and calculations would be made in blocks 4B and 4C. It should be noted that, with multiple measurement antennas 230, user proximity is sensed in block 4E if any one of the SWRs from the measurement antennas is greater than the threshold, Th. It is also noted that measurements using the multiple measurement antennas may be interspersed with transmissions using the main antennas. Thus, blocks 4A-4C may be performed, a main antenna selected in block 4D, and the main antenna used to transmit using normal transmit power (block 4H). Block 4J then causes flow to select another measurement antenna and blocks 4A-4C are performed. This exemplary scenario reduces the duration time spent using the measurement antennas before main antennas are used again for transmission.

Figure 5:
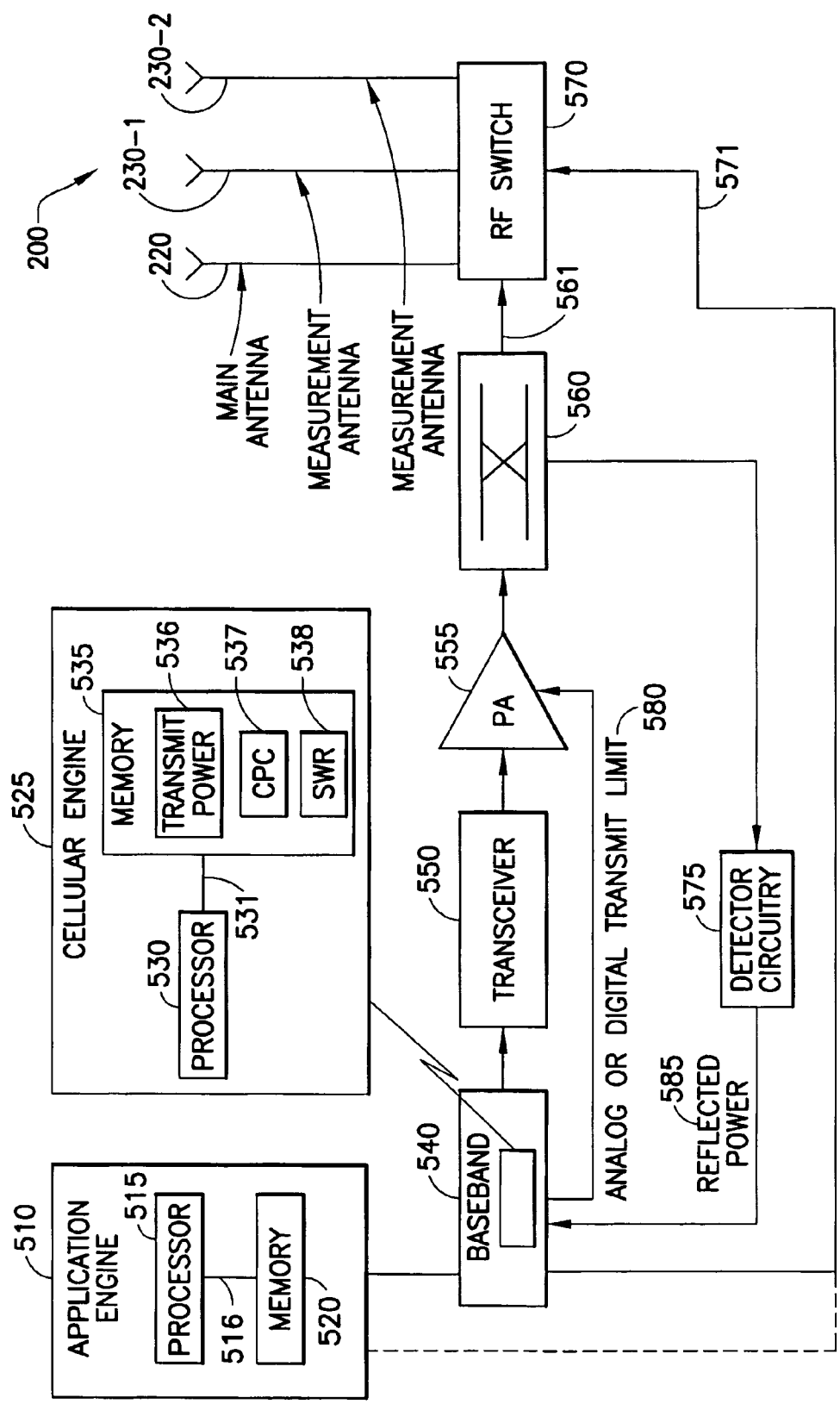
FIGS. 5 and 6 are block diagrams of a transmission pathway in exemplary apparatus (e.g., a wireless device) operating in accordance with a first aspect of the invention.

Referring now to FIG. 5, a block diagram is shown of a transmission path of an exemplary wireless device 200 operating in accordance with a first aspect of the invention. A reception path is not shown, but it is to be understood the main antennas 220 may also be used for reception. The wireless device 200 includes baseband circuitry 540, a transceiver 550, a power amplifier (PA) 555, a directional coupler 560, a radio frequency (RF) switch 570, detector circuitry 575, and an application engine 510. The application engine 510 includes a processor 515 and a memory 520 interconnected by buses 516. The baseband circuitry 540 includes a cellular engine 525, which includes a processor 530 and a memory 535 interconnected by buses 531. The memory 535 includes transmit power 536, computer program code (CPC) 537, and SWR 538. The computer program code 537 includes instructions suitable for execution by the processor 530 and causing the wireless device 200 to perform operations described herein.

The wireless device 200 is any apparatus using one or more antennas to transmit information where SAR requirements need to be met. In general, the various embodiments of the wireless device 200 can include, but are not limited to, mobile phones and other devices using licensed cellular spectra; wireless communication terminals such as personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions; and wireless modems.

An exemplary operation of the wireless device 200 will now be described. In a normal transmit mode, the transmission is directed to main antenna 220, which transmits the transmit signal 561 to a recipient (e.g., a base station). The normal transmit power is used and this transmit power level complies with SAR requirements. In an example, the normal transmit power is set using analog transmit limit 580. The RF switch 570 is set to the main antenna 220 via modification of the antenna selection signal 571. In an example, the processor 530 of the baseband circuitry 540 causes the antenna selection signal 571 to be modified.

In a measurement mode, the transmit signal is directed to measurement antenna 230-1. The RF switch 570 is set to the main antenna 220 via a certain setting of the antenna selection signal 571. Reflected power 585 is measured from the antenna 230-1 by the detector circuitry 575, and the transmit power 536 is known. SWR 538 can be calculated, e.g., by the processor 530. In another example, the detector circuitry 575 can measure the transmit power 536 and provide this to the processor 530. In yet another example, the detector circuitry 575 can determine the reflected power 585 and the transmit power 536 and provide the SWR 538 to the processor 530.

The measurement period can be a few milliseconds, enough time to get a reading for detection and the signal to settle. In some systems, there could be several measurement antennas 230-2 to cover one or more sides of the device and to provide better indication of user proximity. If the measurement antenna 230-2 is used, the RF switch 570 would be directed via the antenna selection signal 571 to switch to the measurement antenna 230-2, and the reflected power 585 and the transmit power 536 are determined and the SWR 538 calculated.

Figure 7:
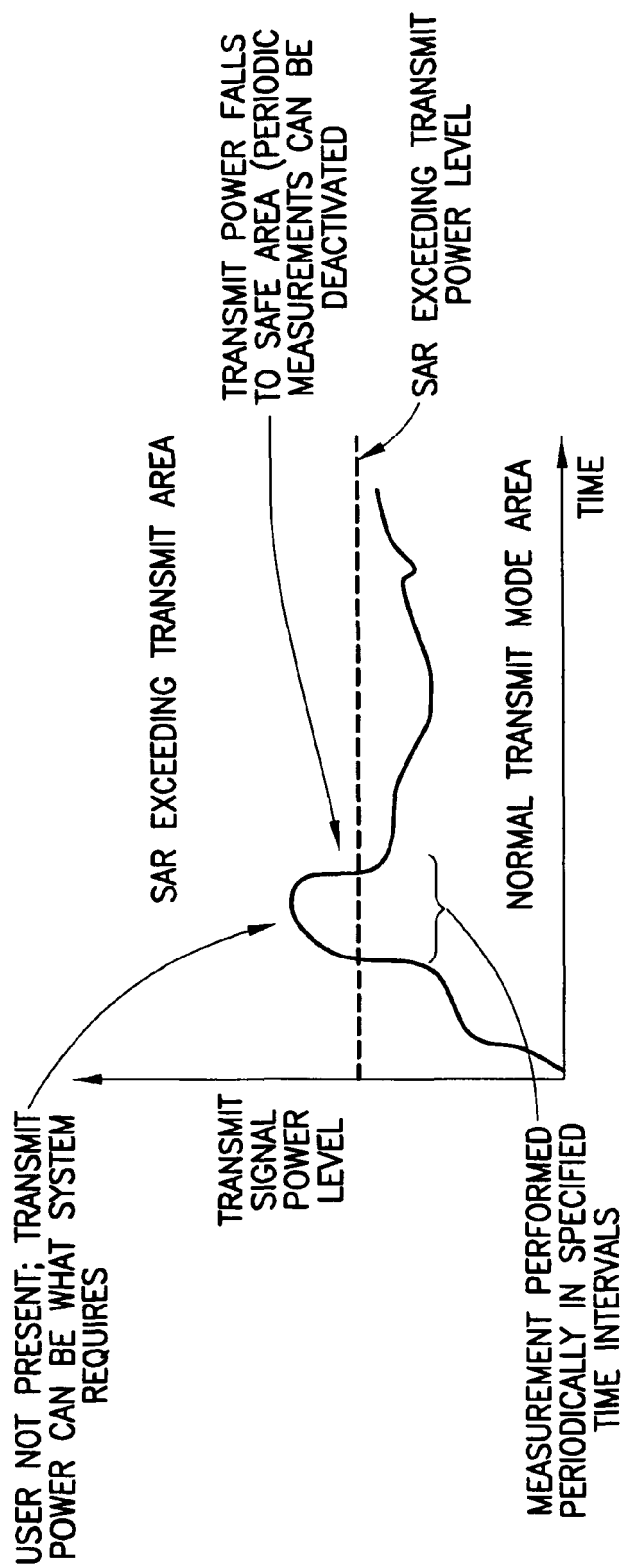
FIG. 7 is a graph of transmit signal power level in time, for when a user is not detected in the presence of the device.

In the case of a SAR exceeding transmit level, SAR limit exceeding power levels can be used only if the user is not present. Typically, it has been verified in the laboratory that there is a transmit level area that exceeds the SAR limits. For example, turning also to FIG. 7, a SAR exceeding transmit power level is shown in FIG. 7, and this level is verified using the wireless device 200 in the laboratory. FIG. 7 also shows a normal transmit mode for the wireless device 200, as a user has not been determined to be proximate the wireless device. It is noted that the selected limited transmit power can be a maximum power used while the wireless device 200 transmits (see FIG. 8). Also, in this example of FIG. 7, there are periodic measurements performed.

Figure 8:
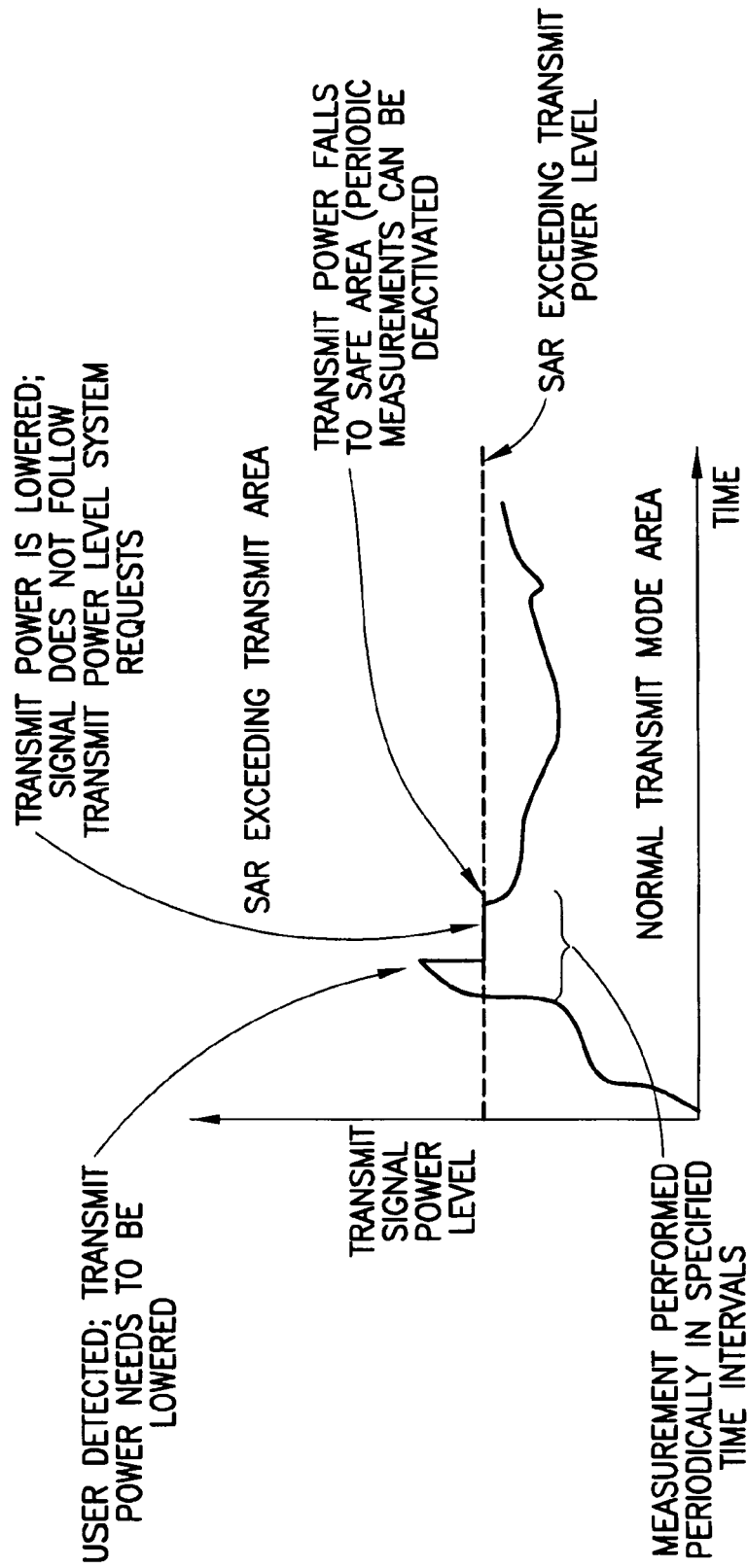
FIG. 8 is a graph of transmit signal power level in time, for when a user is detected in the presence of the device.

The wireless device 200 also has a power back off mode. This mode is used if the user is detected to be proximate the wireless device 200. In an exemplary embodiment, this mode limits the transmit power to the maximum SAR safe limit (e.g., the limited transmit power in FIG. 4), so that if the device is transmitting more power than fulfills SAR requirements when a user is determined to be proximate the wireless device 200, the power is reduced. This is shown in FIG. 8, where the transmit power is lowered from the normal transmit power to the limited transmit power (e.g., a value below the SAR exceeding transmit power level). As shown in FIG. 5 (and FIG. 6), the power back off limiting can be performed in the analog or digital domain, as illustrated in FIG. 5 by using the term the analog or digital transmit limit 580.

FIGS. 7 and 8 therefore show an example where the wireless device 200 uses the main antenna for normal transmit mode, but if the transmit signal needs to be higher than the SAR exceeding transmit power level, measurements should be performed. If the user is present, power back off mode is activated (see FIG. 8) and the measurements repeated in certain intervals to detect a change in user presence. Normal mode can also be entered if the transmit power is lower than SAR exceeding power level.

Detector circuitry 575 can measure reflected RF power that is received from the directional coupler 560. Detection can be analog or digital depending what is already supported by the system or what is more feasible.

The RF switch 570 can direct the signal to measurement antenna(s) or main antenna(s). In normal mode, the signal is directed to main antenna(s) and only in measurement mode is the signal directed to measurement antennas.

For software (e.g., in CPC 537) for power control governing, this software has the following functions in an exemplary embodiment:

1) A switch control;
2) A SWR calculation; and
3) A power limiting function.

In an example, these functions may be split. For instance, the processor 575 of the application engine 510 may perform the SWR calculation and direct the baseband circuitry 540 (e.g., the processor 530) to perform the power limiting function (and the baseband circuitry 540 performs the switch control). As another example, the application engine 510 may operate the antenna selection signal 571 instead of the baseband circuitry.

Figure 6:
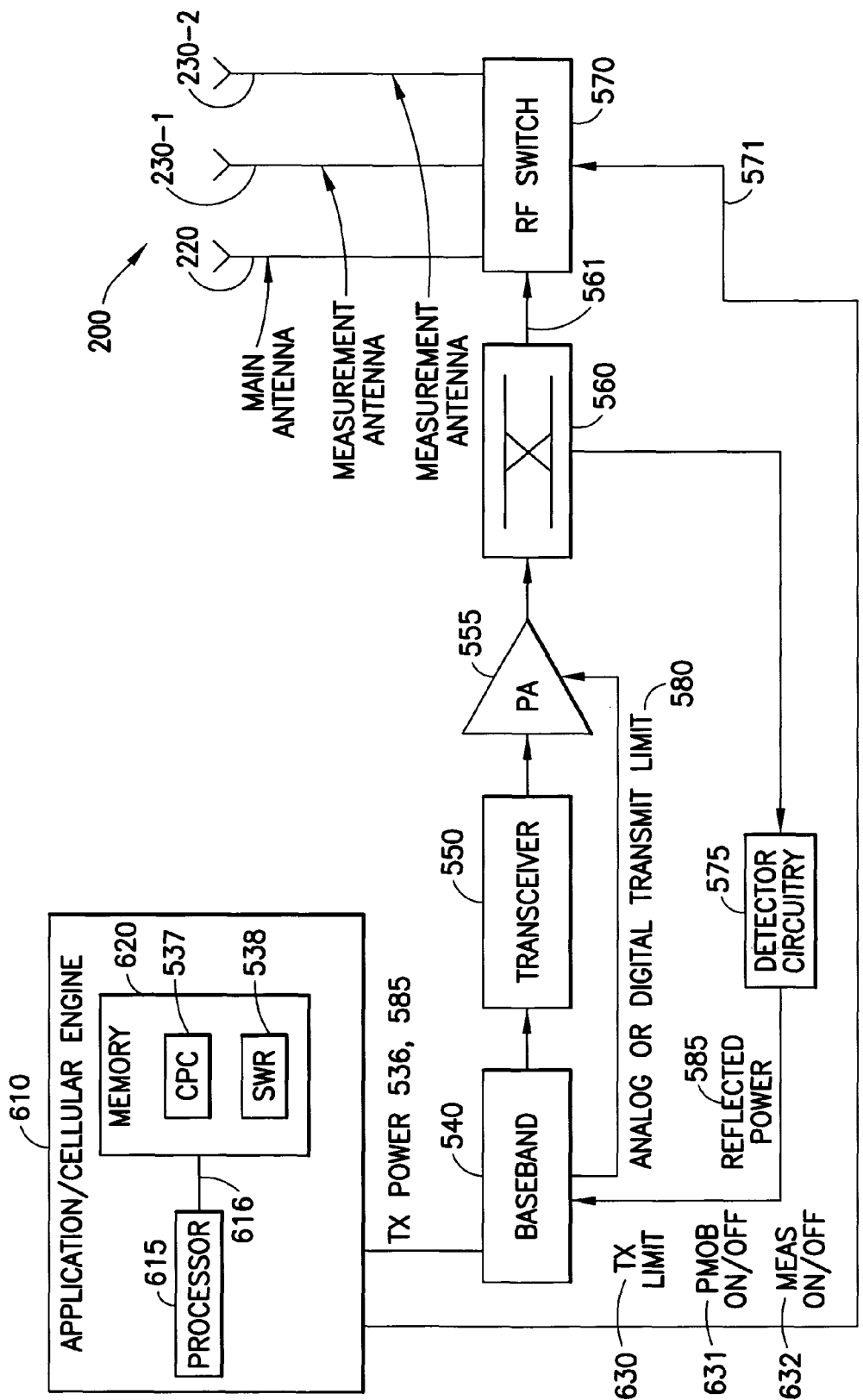

FIG. 6 shows another example, where the application engine and cellular engine are combined into one entity. In this example, the application/cellular engine 610 includes a processor 615 and a memory 620 coupled together through buses 616. The baseband circuitry 540 sends the transmit power 536 and reflected power 585 to the application/cellular engine 610, which calculates the SWR 538. The application/cellular engine 610 provides a value of the limited transmit power as TX limit 630, and also provides a power back off mode (PBOM) ON/OFF signal 631 to the baseband circuitry 540. The PBOM ON/OFF signal 631 directs the baseband circuitry 540 to turn on or off the power back off mode (that is, to limit the transmit power to the limited transmit power sent via the TX limit 630). In one example, the baseband 540 is programmed to take measurements using the measurement antennas 230 whenever the transmit power is greater than a threshold transmit power (e.g., the SAR exceeding transmit power level shown in FIGS. 7 and 8). Additionally, the application/cellular engine 610 could also take over this functionality, by providing a measurements on/off signal MEAS ON/OFF 632, which directs the baseband circuitry to turn on or off the periodic measurements (e.g., as described above in relation to FIGS. 4, 7, and 8). The TX power 536 in this latter example not only indicates transmit power during measurements but also power when the main antennas are used to transmit power (e.g., so that the application/cellular engine 610 can determine at what point to inform the baseband circuitry 540 to begin measurements).

Figure 9:
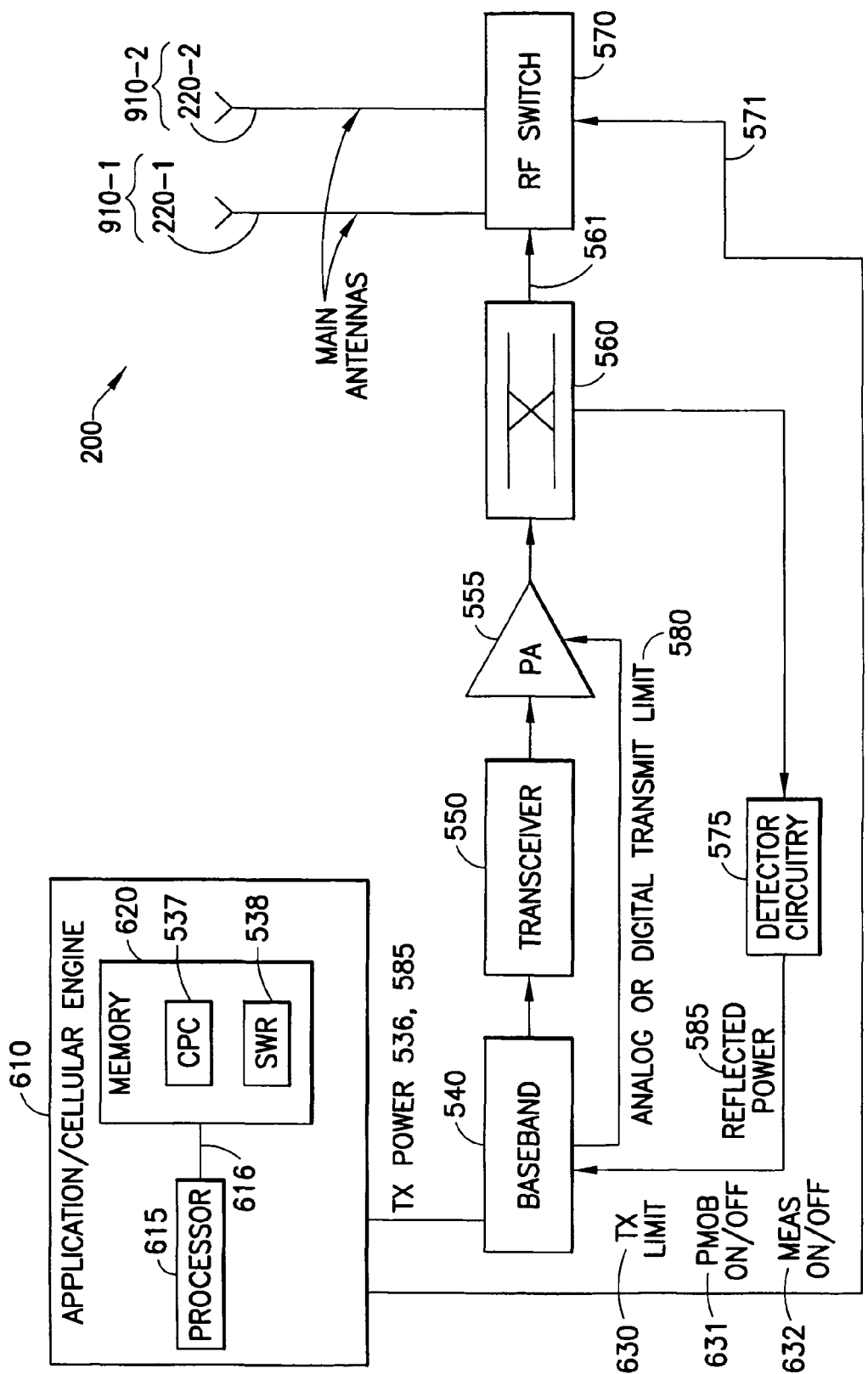
FIG. 9 is another block diagram of a transmission pathway in an exemplary wireless device operating in accordance with a second aspect of the invention.

Turning to FIG. 9, FIG. 9 is another block diagram of a transmission pathway of an exemplary wireless device operating in accordance with a second aspect of the invention. This example uses the wireless device 200 of FIG. 6, but the device of FIG. 5 (and the other options described above) may also be used. In this example, there are no measurement antennas 230, but there are multiple (e.g., two) main antennas 220. These main antennas 220 are operated (e.g., as directed by the CPC 537) via the exemplary techniques described below.

Figure 10:
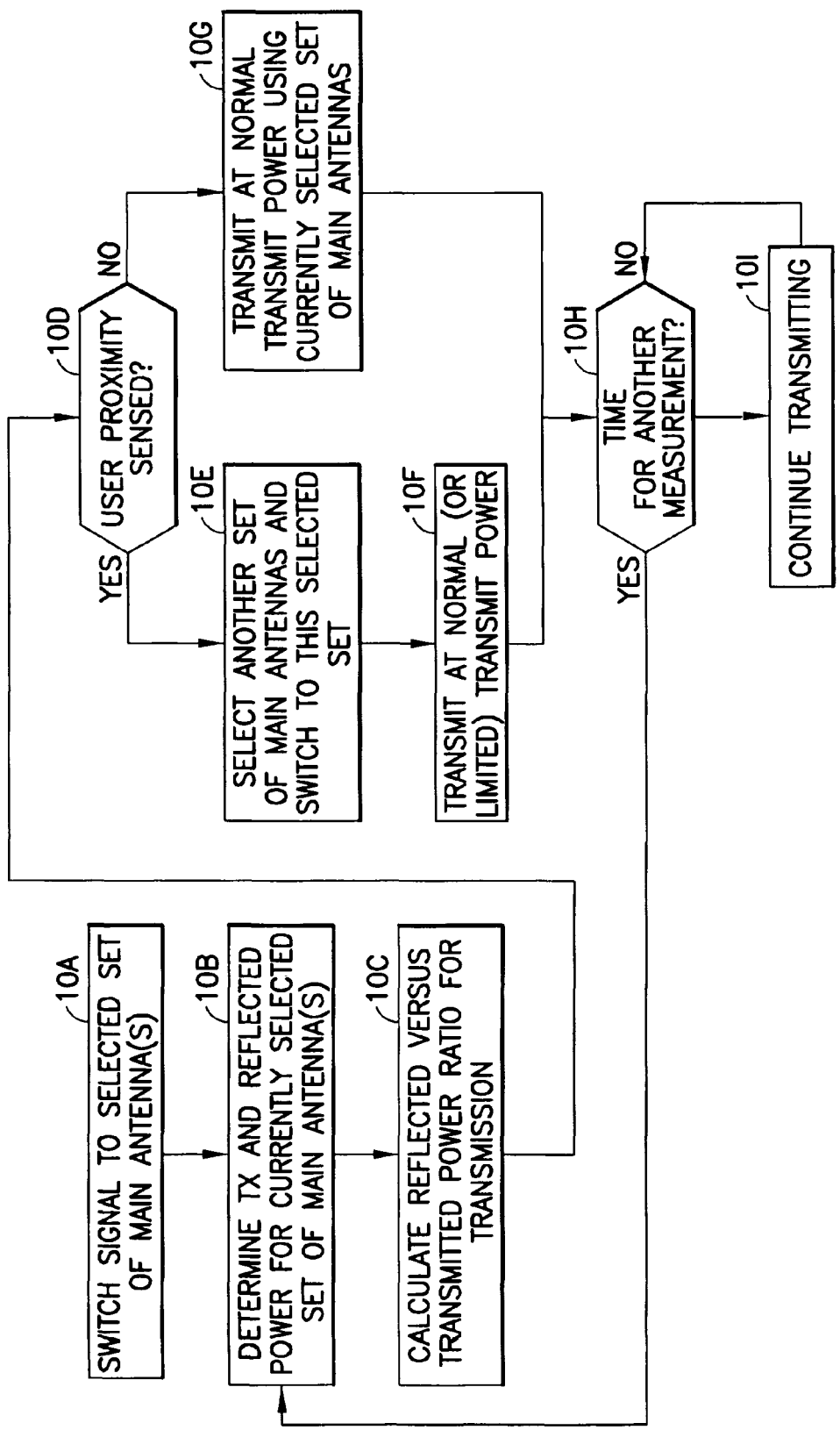
FIG. 10 is a block diagram of an exemplary flowchart for using different main transmit antennas for power adjustment.

Referring to FIG. 10 (in addition to FIG. 9), a block diagram is shown of an exemplary flowchart for using different main transmit antennas 220 for power adjustment. In block 10A, the signal 561 to be transmitted is switched (by the RF switch 570) to the selected set 910 of main antennas 220. The first set 910-1 includes at least one antenna such as 220-1. In block 10B, the transmit (TX) and reflected power for the currently selected set 910 of main antennas 220 is determined. In block 10C, the reflected versus transmitted power ratio for the transmission is calculated (e.g., as SWR). In block 10D, it is determined if user proximity is sensed. If so (block 10D=YES; e.g., SWR>Th), the signal 561 is switched to another selected set of main antennas in block 10E. The second selected set 910-2 of main antennas includes at least one main antenna such as antenna 220-2. In block 10F, transmission occurs at a normal transmit power that should be less than the SAR level. That is, it has been predetermined that if a user is proximate the first set of antennas, transmission cannot occur at maximum transmit power while meeting SAR requirements. However, it has been predetermined that if the user does not move and transmission is routed to the second set of antennas, transmission can occur using the second set of antennas at the maximum transmit power while meeting SAR requirements.

If not (block 10D=NO; e.g., SWR<Th), in block 10G, transmission occurs using the selected set 910 of main antennas 220, with no power limitations (i.e., transmission occurs at normal transmit power). In block 10H, it is determined if it is time for another measurement. If so (block 10H=YES), the flow continues to block 10B. If not (block 10H=NO), flow continues to block 10I, where transmission is continued using one of blocks 10F or 10G.

FIGS. 11 and 12 are illustrations of front views of a mobile device having main antennas 220 placed and operated according to the second aspect of the invention. In FIG. 11, the wireless device 200 is shown in a first orientation. A selected set 910-1 of antennas includes antennas 220-1 and 220-3. A set 910-2 of antennas includes antennas 220-2 and 220-4. In this example, the selected set 910-1 of main antennas is used to transmit because the user is less proximate (i.e., not proximate) the antennas 220-1 and 220-3 and it has been determined in laboratory tests that the SAR exceeding transmit power level is not met using the maximum transmit power level.

When the user changes the orientation of the wireless device 200 to the orientation shown in FIG. 12, now the user is proximate the set 910-1 of main antennas 220-1 and 220-3. According to FIG. 10, the second set 910-2 of main antennas 220-4 and 220-2 is selected as the current set 910 of antennas and are used to transmit the signal at the normal transmit power.

In another exemplary embodiment, the transmit power used in block 10F, e.g., in the second orientation shown in FIG. 12 is lower than the maximum transmit power. In this case, the limited transmit power used for transmission via set 910-2 might still be larger than what the limited transmit power would be if the set 910-1 of antennas was used. In other words, if the first set 910-1 of antennas was used for transmission, the maximum transmit power might be predetermined to be X dBm to meet SAR requirements. If the second set of antennas is used for transmission in block 10F, the maximum transmit power might be predetermined to be Y dBm to meet SAR requirements. Y is greater than X, e.g., by z dB, but is less than the maximum transmit power that the wireless device may produce via, e.g., the power amplifier 555, as defined in regulations.

Without in any way limiting the scope, interpretation, or application of the claims appearing below, a technical effect of one or more of the example embodiments disclosed herein is use of a measurement transmit antenna to determine whether a user is within a predetermined proximity of a mobile device. Another technical effect of one or more of the example embodiments disclosed herein is reducing transmission power in response to detection that a user is within a predetermined proximity of a mobile device.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain or store, communicate, propagate or transport the instructions for use by or in connection with an instruction execution system, apparatus, or device, such as a computer, with one example of a computer described and depicted in FIGS. 5, 6, and 9. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method, comprising:
   transmitting a signal by a wireless device using a main antenna;
   in response to the need for a proximity measurement, switching the transmitting of the signal by the wireless device to a measurement antenna;
   determining by the wireless device whether a user is proximate the wireless device at least by transmitting the signal by the wireless device using the measurement antenna;

in response to a determination the user is not proximate the wireless device, transmitting the signal using the main antenna at a normal transmit power; and in response to a determination the user is proximate the wireless device, transmitting the signal by the wireless device using the main antenna at a limited transmit power that is less than a maximum value the normal transmit power can attain.

2. The method of claim 1, wherein the limited transmit power is less than a power predetermined to meet specific absorption rate (SAR) requirements and wherein the maximum value the normal transmit power can attain exceeds SAR requirements.

3. The method of claim 1, wherein:

determining by the wireless device whether a user is proximate the wireless device further comprises periodically using the measurement antenna to transmit the signal; and the method further comprises switching to the main antenna to transmit the signal at a power determined in accordance with whether the user is or is not proximate the wireless device.

4. The method of claim 1, wherein determining by the wireless device whether a user is proximate the wireless device further comprises:

measuring a reflected power from the measurement antenna sometime during transmission of the signal by the measurement antenna, wherein the reflected power from the measurement antenna is higher when a user is proximate the wireless device than when a user is not proximate the wireless device; and using the measurement of the reflected power, determining whether the user is proximate the wireless device.

5. The method of claim 4, wherein determining by the wireless device whether a user is proximate the wireless device further comprises:

transmitting the signal at a predetermined frequency range using the measurement antenna, wherein the reflected power is higher in the predetermined frequency range when a user is proximate the wireless device than when a user is not proximate the wireless device.

6. The method of claim 4, wherein:

the method further comprises determining a value of transmit power used to transmit the signal using the measurement antenna;

determining by the wireless device whether the user is proximate the wireless device further comprises determining a ratio between the reflected power and the value of transmit power and using the ratio to determine whether the user is proximate the wireless device.

7. The method of claim 6, wherein:

determining a ratio further comprises, using the reflected power and the value of the transmit power, determining a standing wave ratio (SWR); and using the ratio to determine whether the user is proximate the wireless device further comprises in response to the determined SWR meeting a threshold, determining the user is proximate the wireless device and in response to the determined SWR not meeting the threshold, determining the user is not proximate the wireless device.

8. The method of claim 1, wherein there are a plurality of measurement antennas, and wherein determining whether a user is proximate the wireless device further comprises:

selecting one of the plurality of measurement antennas;

determining whether the user is proximate the wireless device at least by transmitting the signal using the selected measurement antenna; and continuing to select each one of the plurality of measurement antennas either until all measurement antennas are selected and used to determine whether the user is proximate the wireless device, or until a determination that the user is proximate the wireless device and in response to the determination the user is proximate the wireless device, performing the transmitting the signal using the main antenna at the limited transmit power.

9. The method of claim 1, wherein:

the main antenna is designed to be used in normal transmission; and the measurement antenna is designed to be highly sensitive to a human proximate the wireless device.

10. An apparatus, comprising:

one or more measurement antennas;

one or more main antennas;

at least one processor; and at least one memory including computer program code, the at least one memory and the computer program code configured to, with the at least one processor, cause the apparatus to perform at least the following:

transmitting a signal by a wireless device using a main antenna;

in response to the need for a proximity measurement, switching the transmitting of the signal by the wireless device to a measurement antenna;

determining by the wireless device whether a user is proximate the wireless device at least by transmitting a signal using the measurement antenna;

in response to a determination the user is not proximate the wireless device, transmitting the signal by the wireless device using the main antenna at a normal transmit power; and in response to a determination the user is proximate the wireless device, transmitting the signal by the wireless device using the main antenna at a limited transmit power that is less than a maximum value the normal transmit power can attain.

11. The apparatus of claim 10, wherein the limited transmit power is less than a power predetermined to meet specific absorption rate (SAR) requirements and wherein the maximum value the normal transmit power can attain exceeds SAR requirements.

12. The apparatus of claim 10, wherein:

determining by the wireless device whether a user is proximate the apparatus further comprises periodically using the selected measurement antenna to transmit the signal; and the method further comprise switching to the at least one main antenna to transmit the signal at a power determined in accordance with whether the user is or is not proximate the apparatus.

13. The apparatus of claim 10, wherein determining by the wireless device whether a user is proximate the apparatus further comprises:

measuring a reflected power from the selected measurement antenna sometime during transmission of the signal by the selected measurement antenna, wherein the reflected power from the selected measurement antenna is higher when a user is proximate the apparatus than when a user is not proximate the apparatus; and using the measurement of the reflected power, determining whether the user is proximate the apparatus.

14. The apparatus of claim 13, wherein determining by the wireless device whether a user is proximate the apparatus further comprises:

transmitting the signal at a predetermined frequency range using the measurement antenna, wherein the reflected power is higher in the predetermined frequency range when a user is proximate the apparatus than when a user is not proximate the apparatus.

15. The apparatus of claim 13, wherein:
the at least one memory and the computer program code are further configured to, with the at least one processor, cause the apparatus to perform at least the following:
determining a value of transmit power used to transmit the signal using the measurement antenna;
determining by the wireless device whether the user is proximate the apparatus further comprises determining a ratio between the reflected power and the value of transmit power and using the ratio to determine whether the user is proximate the apparatus.

16. The apparatus of claim 15, wherein:
determining a ratio further comprises, using the reflected power and the value of the transmit power, determining a standing wave ratio (SWR); and
using the ratio to determine whether the user is proximate the apparatus further comprises in response to the determined SWR meeting a threshold, determining the user is proximate the apparatus and in response to the determined SWR not meeting the threshold, determining the user is not proximate the apparatus.

17. The apparatus of claim 10, wherein the one or more measurement antennas are a plurality of measurement antennas, and wherein determining whether a user is proximate the apparatus further comprises:
selecting one of the plurality of measurement antennas;
determining whether the user is proximate the apparatus at least by transmitting the signal using the selected measurement antenna; and
continuing to select each one of the plurality of measurement antennas either until all measurement antennas are selected and used to determine whether the user is proximate the apparatus, or until a determination the user is proximate the apparatus and in response to the determination the user is proximate the apparatus, performing the transmitting the signal using the main antenna at the limited transmit power.

18. The apparatus of claim 10, wherein:
the apparatus comprises one or more of a wireless communication terminal, a mobile phone, or a wireless modem.

19. A method, comprising:
transmitting a signal by a wireless device using a first set of antennas;
in response to the need for a proximity measurement, switching the transmitting of the signal by the wireless device to a second set of antennas;
determining by the wireless device whether a user is proximate the wireless device at least by transmitting a signal using at least one of the second set of antennas;
in response to a determination the user is not proximate the wireless device, transmitting the signal using the second set of antennas; and
in response to a determination the user is proximate the wireless device, switching the signal to the first set of antennas in the wireless device and transmitting the signal using the first set of antennas.

20. The method of claim 19, wherein:
transmitting the signal using the second set of antennas further comprises transmitting the signal at a normal transmit power; and
transmitting the signal using the first set of antennas further comprises transmitting the signal using the first set of antennas at a limited transmit power that is less than a maximum value the normal transmit power can attain.

21. The method of claim 19, wherein:
transmission using the second set of antennas is predetermined to not meet specific absorption rate (SAR) requirements if the transmission using the second set of antennas occurs at a maximum value a normal transmit power can attain; and
transmission using the first set of antennas is predetermined to meet specific absorption rate (SAR) requirements if the transmission using the first set of antennas occurs at the maximum value the normal transmit power can attain.

22. The method of claim 19, wherein in response to the need for a proximity measurement, switching the transmitting of the signal by the wireless device to a second set of antennas, the transmitted signal is not disturbed in any way.

* * * * *